United States Patent [19]

Brückmann et al.

[11] Patent Number: 4,773,079
[45] Date of Patent: Sep. 20, 1988

[54] PROCESS FOR MELTING DOWN AND DEGASSING LUMPY MATERIAL

[75] Inventors: Gerhard Brückmann, Püttlingen; Johann Kemmer, Rödermark; Felix Müller, Gelnhausen; Detley Schlebusch, Wöllstadt; Ulrich Hensgen, Hammersbach, all of Fed. Rep. of Germany

[73] Assignee: Leybold-Heraeus GmbH, Cologne, Fed. Rep. of Germany

[21] Appl. No.: 896,935

[22] Filed: Aug. 15, 1986

[30] Foreign Application Priority Data

May 23, 1986 [DE] Fed. Rep. of Germany ....... 3617303

[51] Int. Cl.$^4$ .................................................. F27D 7/00
[52] U.S. Cl. ................................................... 373/141
[58] Field of Search ............... 373/140, 141, 146, 138, 373/151–158

[56] References Cited

U.S. PATENT DOCUMENTS

| 1,031,257 | 7/1912 | Greene | 373/140 |
| 3,004,092 | 10/1961 | Thelemarck | 373/141 |
| 3,443,806 | 5/1969 | Galey et al. | 373/146 |
| 3,618,917 | 11/1971 | Fredrikson et al. | 373/146 |

Primary Examiner—Roy N. Envall, Jr.
Attorney, Agent, or Firm—Felfe & Lynch

[57] ABSTRACT

Process for melting down and degassing lumpy material by means of inductive heating and under subatmospheric pressure in a melting crucible. For the purpose of shortening the duration of the process, scavenging gas and/or reaction gas is introduced into the bottom region of the melting crucible during at least 50% of the duration of the process until the material is melted down completely.

3 Claims, 2 Drawing Sheets

PROCESS FOR MELTING DOWN AND DEGASSING LUMPY MATERIAL

The invention relates to a process for melting down and degassing lumpy material by means of inductive heating under subatmospheric pressure in a melting crucible.

The process of melting down lumpy metallic charging material in a vacuum induction furnace and, after the material has been fused completely, acting upon the melt with a scavenging gas in order to roll around the individual volume elements of the melt in the direction of the melt surface and to intensify the gas exchange, is well known. Conducting the process in this manner makes it necessary to limit the power supplied during the melting-down phase and also to continue the heating, even if with reduced power, during the subsequent treatment with scavenging gas, in order to avoid inadmissible cooling of the melt. Nevertheless, with the known process, it cannot be prevented that the melt commences to boil relatively vigorously at the start of the introduction of the scavenging gas, so that the service life of the brick lining of the crucible is reduced markedly. Moreover, the duration of one cycle of the process is rather long, so that the profitability of the use of the relatively expensive installation for such a process is curbed.

It is therefore an object of the invention to improve a process of the initially described kind in such a manner, that the duration of a cycle of the process is reduced and the melting and degassing installation can be operated more economically.

This objective is accomplished inventively for the process described at the beginning owing to the fact that scavenging gas and/or reaction gas is introduced into the bottom region of the melting crucible already for at least 50% of the duration of the process until the material is melted down completely.

In this connection, it is particularly advantageous to commence introducing the scavenging gas and/or the reaction gas as soon as the melting crucible is filled at least 5% with melt, this percentage being based on the total amount of material to be melted.

Such a conduct of the process is associated with a whole series of advantages:

Through introducing scavenging gas during the melting-down process, the desorption of gases from charging material, that is still cold or has been preheated, is increased. The skin of melt, formed on the charging material, is in contact with the surrounding vacuum from the very start, with the result that degassing is effective. The melt, running or trickling down, is also subject to a further degassing effect. Local development of a high partial pressure of the gases released is effectively prevented or reduced by the rising scavenging gas.

An additional absorption of gas by the melt, such as occurs in the state of the art, is reduced or prevented. By constantly scavenging the liquid phase that is forming and gradually increasing, the material to be melted is partially degassed directly. As the melt level rises, the scavenging effect, which initially is only a central effect, is extended to the whole of the volume due to the fact that the bath is rotated. More particularly, at the end of the melting process there is the usual degassing at the melt surface due to the circulation of the melt.

The so-called boil-off reaction of the melt is distributed over a longer period of time and extends only to the already melted material. As a result, a very vigorous boiling reaction is largely prevented and erosion of the brick lining of the crucible is reduced, so that the service life of the crucible is increased appreciably.

In turn, as a consequence of the processes described above, the maximum melting-down power can be increased by 5 to 25% over that of the state of the art and the overall duration of a cycle of the process is correspondingly reduced. Moreover, the full melting power can be applied up to the end of the melt-down process, since the process cycle is practically completed when the charging material has been totally melted. Due to the merger of the two process steps of melting down and treating with scavenging gas and due to the higher melting-down power, the total heating time can be decreased by 30 to 50% and the degassing time of the melt reduced correspondingly. The melting process of the solid charging material is also accelerated by the constant scavenging.

The process can be optimized further by increasing the amount of scavenging gas per unit time as the amount of melted material increases.

The invention is explained in greater detail below by means of the FIGS. 1 and 2.

Figure 1:
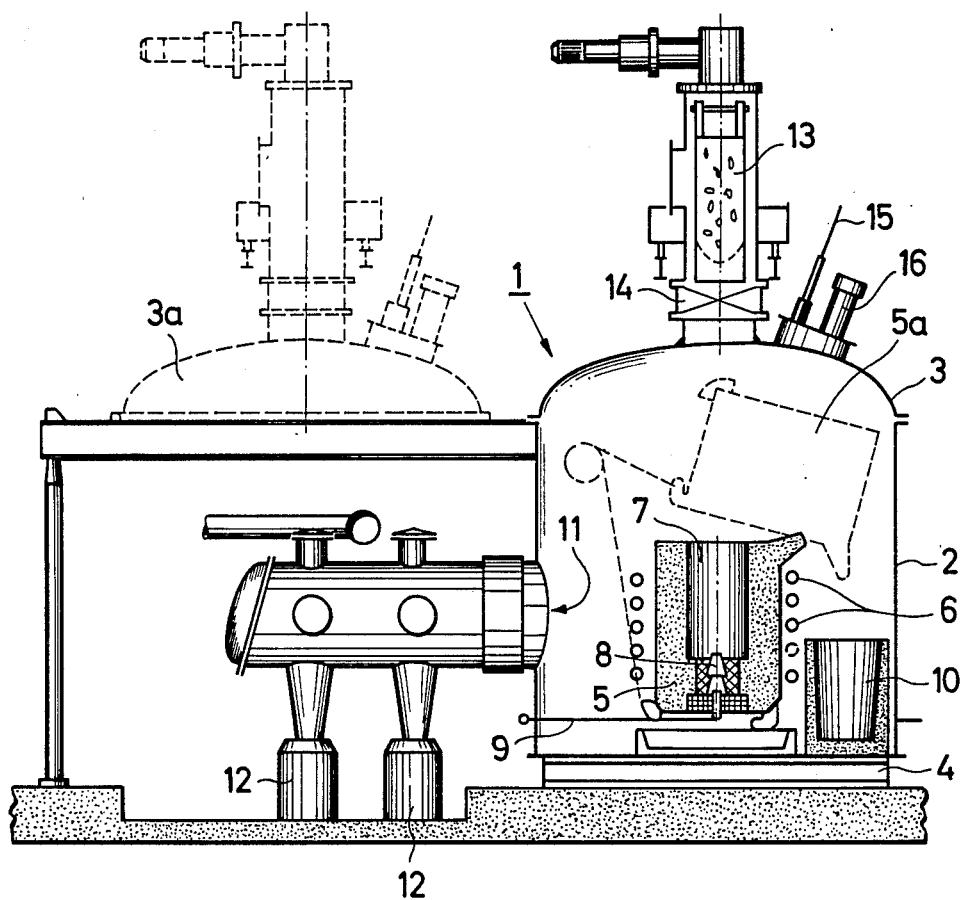
FIG. 1 shows equipment, in which the conventional process as well as the inventive process can be carried out.

In FIG. 1, a vacuum induction furnace 1 is shown, which has a vacuum chamber 2 with a laterally movable cover 3, a base plate 4 and a melting crucible 5, which is surrounded by an induction coil 6. Within a brick lining, which is not shown, the melting crucible has a cavity 7 for accommodating the charging material or the melt. A scavenging stone 8, comprising a ceramic, gas-permeable composition and connected over a gas pipeline 9 with a source (not shown here) of scavenging gas, discharges through the base of the melting crucible 5 into this cavity. The melting crucible 5, together with the induction coil 6, can be brought into position 5a, which is shown by the broken line, and the contents of said crucible can be cast into a kettle 10.

The vacuum chamber 2 is connected over an exhaust opening 11 with a set of vacuum pumps 12, the details of which are not shown.

The cover 3 is furthermore provided with a charging device 13, over which it is loaded with charging material. The charging device 13 can be separated by a vacuum gate valve 14 from the vacuum chamber 2. A measuring lance 15 and an observation device 16 complete the whole equipment.

The cover 3 can be moved to the left into position 3a, shown by the broken line, in which the vacuum chamber 2 is freely accessible from above.

Figure 2:
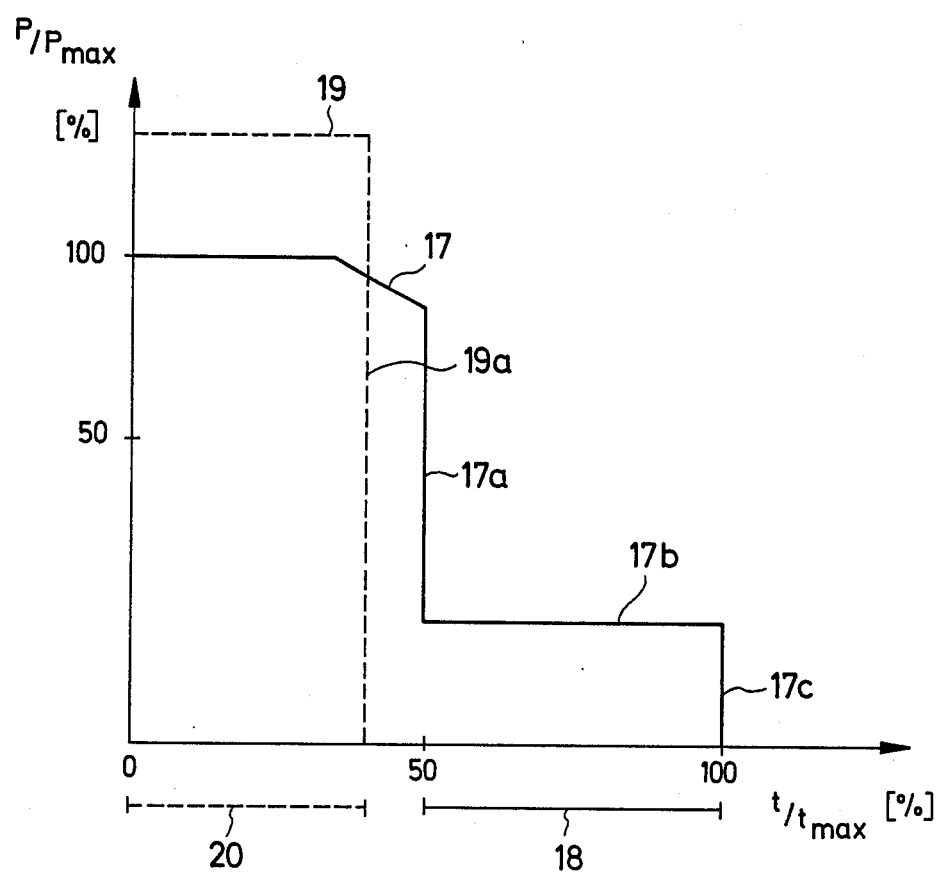
FIG. 2 shows a diagram comparing the conventional process with the inventive processes.

FIG. 2 now shows the two alternative modes of operation for the equipment of FIG. 1.

The solid line 17 shows the melt power for the conventional process as a function of time. At the time t=0, 100% of the heating power is switched on here. The first vertical section 17a of line 17 symbolizes the end of the melting-down process. Shortly before, the melting-down power is gradually reduced. At the end of the melting-down process, the scavenging gas is turned on, bar 18 representing the time during which scavenging gas is supplied. For the duration of the treatment with the scavenging gas in the region of curves 17b and 17c, heating is continued with about 20 to 30% of the rated power. It goes without saying that amount of scavenging gas supplied can be increased only gradually, in order to prevent an excessively vigorous boiling reaction. The curve, shown by the broken line, represents the course of the inventive process. The melting power can be increased over that of conventional melting power, as shown by line 19. Bar 20 shows that the scavenging gas is turned on already at the start of the melting process and is turned off again at the end of the melting process together with the melting current, as is evident from the vertical section of the line 19a.

What is claimed is:

1. Process for melting down and degassing metallic material by means of inductive heating and under subatmospheric pressure in a melting crucible in a vacuum chamber, comprising: introducing at least one of scavenging and reaction gas into the bottom region of the melting crucible during at least 50% of the duration of the melt-down process until the material is melted down completely, and pumping the vacuum chamber to maintain the subatmospheric pressure therein during the process.

2. Process as defined in claim 1, comprising: commencing the introduction of at least one of the scavenging gas and the reaction gas as soon as the melting crucible is filled at least 5% with melt, this percentage being based on the total amount of the material to be melted.

3. Process as defined in claim 2, comprising: increasing the amount of scavenging gas per unit time as the amount of melted material increases.

* * * * *